United States Patent Office 3,550,272
Patented Dec. 29, 1970

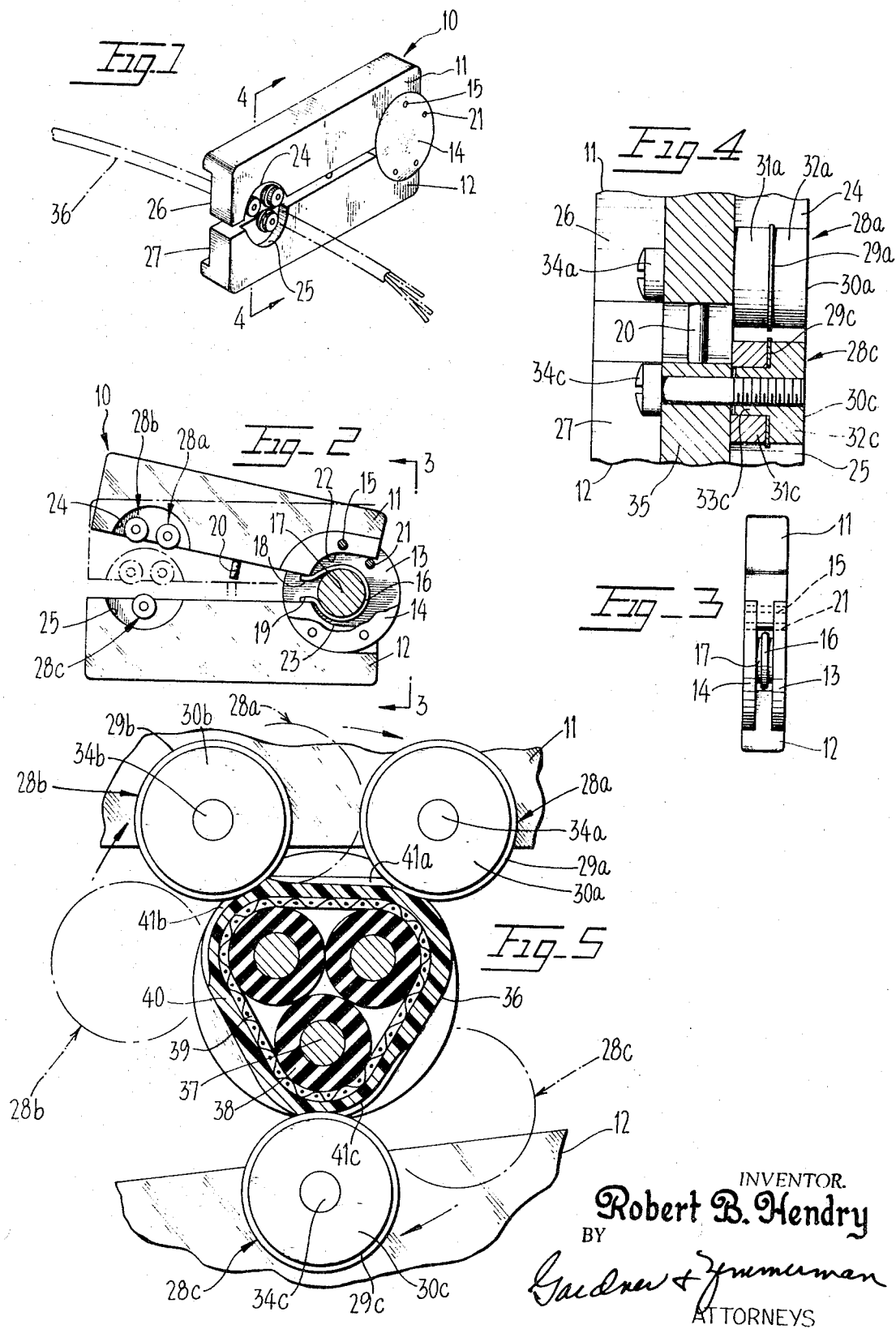

3,550,272
CUTTING DEVICE FOR WIRE INSULATION
Robert B. Hendry, 45833 Warm Springs Blvd.,
Fremont, Calif. 94538
Filed May 31, 1968, Ser. No. 733,591
Int. Cl. B21f 13/00; B26b 27/00
U.S. Cl. 30—90.1                                  9 Claims

ABSTRACT OF THE DISCLOSURE

A cutting device for scoring or partially severing the outer insulation or shielding of wire or wire cables to enable such outer insulation to be removed therefrom. The cutting device includes a pair of hingedly connected jaw elements angularly movable relative to each other between open and closed positions and equipped with a plurality of blades operative to cut such insulation upon closure of the jaw elements thereagainust and angular displacement of the cutting device and blades relative thereto. The device is equipped with depth-limiting structure adjacent each blade and engageable with the insulation so as to limit penetration of the blades thereinto.

---

This invention relates to a cutting device, and more particularly, to a cutting device for scoring or partially severing wire insulation and the like to enable the insulation to be broken or fractured at the score line and then removed, all without inadvertent damage to the wire conductors or other elements located within the interior of the insulation.

Although the advent of printed and integrated circuitry has reduced the use of wire conductors in electronic equipment, there are still many environments and locations at which wire must be employed. In many such environments, the conductor array is complex and may include wire or wire cabling comprising several individual conductors, each of small diameter and insulated, confined within a metal shielding which is encapsulated within an outer insulator, a polyurethane heat shield for example. Quite clearly, it is necessary to form various junctions and interconnections along such conductors, and this requires cutting the same to the proper length and stripping the insulation as necessary to expose the inner metal conductors. Since in many cases the wire conductors are quite small and delicate, they are easily damaged, often without knowledge, unless great care is exercised; and unknown damage can cause shorting, fire and at times can lead to great disaster, particularly in the environment of spacecraft and other aircraft.

Although a number of techniques and devices have been developed for stripping wire (both single-conductor and multiple-conductor) of its insulation, so far as is known no versatile cutting device is now available which can be used to cut wire insulation, and especially the outer insulation of multiple-conductor wire, without the possibility of inadvertently damaging the conductor or other components located within such insulation; and it is accordingly an objective, among others, of the present invention to provide an improved cutting device for scoring or partially cutting wire insulation and the like to enable separaton and removal thereof without the possibility of inadvertent damage occurring to components located within the confines of the insulation. Another objective of the invention is in the provision of an improved cutting device of the character described which is automatically operable without adjustment to accommodate insulation-equipped wire of different sizes so as to score the insulation in each instance without completely penetrating the same, thereby obviating the possible occurrence of damage to any components confined within the insulation. Additional objectives and advantages of the invention will become apparent as the specification proceeds.

A structural embodiment of the present invention includes a pair of jaw elements hingedly interconnected for angular displacements between open and closed positions, and which jaw elements are equipped with a plurality of blades operative to engage and cut the outer insulation of an electric wire upon closing of the jaw elements thereagainst and rotational displacement of the cutting device with respect to such wire. A depth-limiting structure is arranged with each blade so as to limit penetration thereof into the insulation by engagement therewith. As a result of such relationship utilizing the insulation itself as the means for limiting penetration of the cutting blades thereinto, the cutting device is able to accommodate automatically and without adjustment insulation-equipped wire of different sizes.

An embodiment of the invention is illustrated in the accompanying drawings in which:

FIG. 1 is a perspective view showing the cutting device in a closed position of engagement with a multiple-conductor wire illustrated in phantom;

FIG. 2 is a side view in elevation of the cutting device showing the open position of the jaw elements in full lines and the closed position in broken lines;

FIG. 3 is an end view in elevation taken along the plane 3—3 of FIG. 2;

FIG. 4 is an enlarged vertical sectional view taken along line 4—4 of FIG. 1; and FIG. 5 is a greatly enlarged side view in elevation, similar to that of FIG. 2, but showing the cutting blades of the device in operative engagement with an insulation-equipped multiple-conductor wire.

The specific embodiment of the cutting device shown in the drawings is approximately full size in FIG. 1, and is designated in its entirety with the numeral 10. The device 10 includes a pair of jaw elements 11 and 12 supported for relative movement between open and closed positions. In this respect the jaw elements are hingedly connected adjacent one of their ends for pivotal or angular displacements between such open and closed positions which are respectively illustrated by full and broken lines in FIG. 2. In order to interconnect the jaw elements 11 and 12 for such relative angular displacements thereof, the lower jaw element is rigidly affixed by suitable fasteners such as cap screws to a pair of plates 13 and 14 respectively disposed along the outer sides of such jaw element. The upper jaw element 11 is pivotally supported between the plates 13 and 14 by a pin 15 extending therethrough that enables the upper jaw to swing or pivot between the alternate positions thereof shown in FIG. 2, that constitute the open and closed positions of the jaw elements.

The jaw elements 11 and 12 are resiliently biased toward the open position thereof by a somewhat C-shaped spring 16 positioned circumjacent a connector post 17 extending between the plates 13 and 14 and fixedly confined thereby. The spring 16 along the open side thereof has longitudinally projecting end portions 18 and 19 that respectively bear against adjacent surfaces provided by the jaw elements 11 and 12. The jaw elements are angularly displaceable toward each other against the biasing force of the spring 16 toward a fully closed position defined by a stop 20 secured to the upper jaw element 11 and located so as to abut the facing surface provided by the lower jaw element 12, as shown in FIG. 4. The fully open position of the jaw elements is defined by abutment of a corner portion of the upper jaw element 11 with a stop 21 extending between the plates 13 and 14 and fixedly held thereby.

The jaw elements 11 and 12 are generally rectangular and have somewhat arcuate openings 22 and 23 respectively provided at the pivotally connected ends thereof to accommodate the connector post 17 and provide space for the relative angular displacements of the jaw elements. Adjacent their opposite ends and along the facing edges thereof, the jaw elements are respectively provided with semi-cylindrical recesses 24 and 25 that have a depth of or extend inwardly for about one-third the thickness of the jaw members, as is most evident in FIG. 4. It may be observed that along the opposite sides of faces of the jaw members they are respectively provided with enlarged recesses 26 and 27 generally aligned with the respective associated recesses 24 and 25 and also extending inwardly a distance about equal to one-third the thickness of the jaw elements.

A plurality of cutting mechanisms are mounted within the recesses 24 and 25, and each such mechanism includes both a cutting blade operative to score or cut the outer insulation provided by an electric wire or wire cable and a depth-limiting structure engageable with such insulation for limiting penetration of the blade thereinto. A plurality of such cutting mechanisms are provided and, in this respect, the particular cutting device 10 illustrated has three such mechanisms spaced apart so as to define a cutting station adapted to receive insulation-equipped wire therein. The jaw element 11 has two such mechanisms respectively designated with the numerals 28a and 28b and the jaw element 12 has one such mechanism designated with the numeral 28c. The mechanisms 28 are all identical and, accordingly, it is evidently necessary to describe only one in detail.

Referring to FIG. 4 in particular, and considering the mechanism 28c, it is seen to comprise a cutting blade 29 (the letter suffixes being used where appropriate in the drawings to identify the components respectively associated with the various mechanisms 28a, 28b, and 28c) which is cylindrical in configuration and, more especially, is a ring-shaped annulus defining a relatively large opening through the center thereof. The depth-limiting structure associated with the blade 29 is designated with the numeral 30 and is formed in two parts comprising an inner ring-shaped washer or spacer 31 having a center opening approximating in diameter that of the blade 29, and an outer nut 32 having a central hub or collar 33 extending through the opening in the blade 29 and into the opening in the spacer 31. The aggregate thickness or width of the spacer 31 and blade 29 is somewhat greater than that of the hub 33 so that tightening a fastener in the form of a threaded bolt 34 projecting through an opening provided therefor in the web 35 of the associated jaw element and threadedly received within the nut 32 fixedly constrains the blade 29 between the nut and spacer.

Accordingly, each mechanism 28 has a blade 29 that extends radially outwardly from the cylindrical surface of the associated depth-limiting structure 30 to provide a cylindrical or circumferential cutting edge of predetermined extent. It will be appreciated that the depth to which each blade 29 can penetrate the outer insulation forming a part of an electric wire or wire cable is determined by the extent to which the blade projects outwardly from the cylindrical surface of the associated depth-limiting structure because such surface is adapted to engage the insulation and thereby positively limit penetration by abutment therewith. In the particular device 10 being considered, each blade 29 projects outwardly a distance of about 0.005 of an inch from the surface of the depth limiting structure. Since the blades 29 are fixedly constrained against movement during use of the device, one particular area of each blade will engage the insulation and perform the severance or scoring thereof. As such particular blade area becomes dull, the bolt 34 of each mechanism can be loosened slightly and the blade 29 thereof displaced angularly to present another area for use at the wire cutting station. The blades 29 are in substantial alignment and the stop 20 maintains the same in spaced relationship for protection thereof should the jaw elements be completely closed with no wire located at the cutting station.

The cutting device 10 can be used with a great variety of electric wires or wire cables, and a particular instance thereof is the rather complex wire 36 illustrated in FIGS. 1 and 5. Such wire includes a plurality of individual current-carrying metallic conductors 37 (there being three in the conduit 36) each of which is enclosed within an electrical insulating sheave or covering 38. Surrounding the three conductors is a metallic shield 39 in the form of braided metal strands and usually has for its function the electromagnetic isolation of the conductors. Surrounding the magnetic shield 39 is a layer of insulation 40 which in many instances is a thermal shield or high temperature insulator such as polyurethane. Such wires are well known in the electronics industry and are not per se germane to the present invention. Thus the wire 36 may be taken to be conventional with the outer layer of insulation 40 being thermal insulation to protect the inner conductors from a high temperature environment. It might be observed, however, that such insulation 40 is usually somewhat hard and is twisted so that it appears to have a plurality of helically disposed ridges and grooves extending therealong which makes cutting thereof somewhat more difficult.

To use the cutting device 10, a wire 36 is positioned within the cutting station defined between the spaced apart mechanisms 28, and such insertion of the wire is readily accomplished since the jaw elements 11 and 12 are biased into their open position by the spring 16. The jaws 11 and 12 are then closed manually to bring the blades 29 into engagement with the outer insulation 40, as shown in FIG. 5. The cutting device 10 is next rotated or displaced angularly relative to the wire which causes each of the blades 29 to penetrate and partially cut or score the insulation 40, as shown by the score lines or lines of severance 41a, 41b and 41c in FIG. 5. Since three blades are employed, it is not necessary that the device 10 be displaced through a complete 360° rotation in order to completely score the insulation 40; and when the scoring thereof has been completed, the jaws 11 and 12 are released to enable the spring 16 to return the same to their open position. The cut section of insulation is then removed from the wire by slight distortion thereof adjacent the score line, as by slightly flexing and/or slightly rotating the insulation on opposite sides of the score line, to completely break off the insulation section after which it can be stripped from the wire.

As is clear in FIG. 5, the depth-limiting structures 30 bear against the outer surface of the insulation 40 and thereby positively limit the depth to which the blade 29 can penetrate the insulation. Therefore, the cutting device 10 is automatically able to accommodate electric wires of different size, within the design limits of the device, to score the outer insulation thereof wholly without adjustment of the device simply by closing the blades 29 into engagement with the insulation of any such wire.

While in the foregoing specification an embodiment of the invention has been set forth in considerable detail for purposes of making a complete disclosure thereof, it will be apparent to those skilled in the art that numerous changes may be made in such details without departing from the principles and spirit of the invention.

I claim:

1. A cutting device for scoring the outer insulating cover of an electric cable or the like to enable separation and removal therefrom of a portion of such cover, comprising a pair of essentially similar jaw elements disposed in edge to edge juxtaposition and each being a generally planar component having substantially parallel side walls, hinge structure pivotally interconnecting said jaw elements adjacent one end thereof for swinging movements toward and away from each other along said juxtaposed edges between open and closed positions, spring means resiliently biasing said jaw elements toward the open position thereof, a plurality of blades at least one of which is carried by each of said jaw elements adjacent the other end thereof and along said juxtaposed edges for movement with said jaw elements between such open and closed positions and being operative to cut such insulating cover when closed there against and displaced relative thereto by said jaw elements, and depth-limiting structure associated with each of said blades and engageable with such insulating cover for limiting penetration of said blades thereinto, said hinge structure and blades being substantially confined within the width of said jaw elements so that there are essentially no outward projections beyond the aforesaid parallel side walls of said jaw elements.

2. The cutting device of claim 1 in which said hinge structure includes a pair of transversely spaced plates and a connector post extending therebetween, and in which said jaw elements are provided along each side wall thereof with hinge recesses seating said plates therein.

3. The cutting device of claim 2 in which one of said jaw elements is fixedly secured to said plates, and further comprising a pivot pin extending through said plates and the other of said jaw elements to pivotally support the latter for swinging movements as aforesaid.

4. The cutting device of claim 1 in which said jaw elements are provided along one of said side walls thereof with blade recesses, each of the aforesaid blades being seated within the blade recess of the associated jaw element.

5. The cutting device of claim 4 in which said jaw elements are provided along the other of said side walls thereof with fastener recesses generally aligned with said blade recesses, and further comprising releasable fastener structure fixedly securing said blades to said jaw elements and being respectively seated within the associated fastener recesses, each of said blades having a substantially continuous cutting edge enabling various areas therealong to be selectively disposed for cutting engagement with such insulating cover upon release of the fastener structure associated with any particular cutting blade.

6. The cutting device of claim 1 and further comprising a pair of stops respectively associated with said jaw elements to define the maximum open and closed positions thereof.

7. The cutting device of claim 1 in which said hinge structure includes a pair of transversely spaced plates and a connector post extending therebetween, in which said jaw elements are provided along each side wall thereof with hinge recesses seating said plates therein, and in which said jaw elements are provided along one of said side walls thereof with blade recesses, each of the aforesaid blades being seated within the blade recess of the associated jaw element.

8. The cutting device of claim 7 in which one of said jaw elements is fixedly secured to said plates, further comprising a pivot pin extending through said plates and the other of said jaw elements to pivotally support the latter for swinging movements as aforesaid, and in which said jaw elements are provided along the other of said side walls thereof with fastener recesses generally aligned with said blade recesses, and further comprising releasable fastener structure fixedly securing said blades to said jaw elements and being respectively seating within the associated fastener recesses, each of said blades having a substantially continuous cutting edge enabling various areas therealong to be selectively disposed for cutting engagement with such insulating cover upon release of the fastener structure associated with any particular cutting blade.

9. The cutting device of claim 8 and further comprising a pair of stops respectively associated with said jaw elements to define the maximum open and closed positions thereof.

References Cited

UNITED STATES PATENTS

| | | | |
|---|---|---|---|
| 1,841,251 | 1/1932 | Miller | 30—91.2 |
| 3,025,597 | 3/1962 | Huglin | 30—91.2 |
| 3,216,110 | 11/1965 | Stallings. | |

FOREIGN PATENTS

| | | | |
|---|---|---|---|
| 232,968 | 8/1910 | Germany | 30—320 |

JAMES L. JONES, Jr., Primary Examiner

U.S. Cl. X.R.

30—91.2